Dec. 12, 1961 M. KLEINMAN 3,012,248
ANTI-FOG LENS
Filed May 31, 1960 4 Sheets-Sheet 1
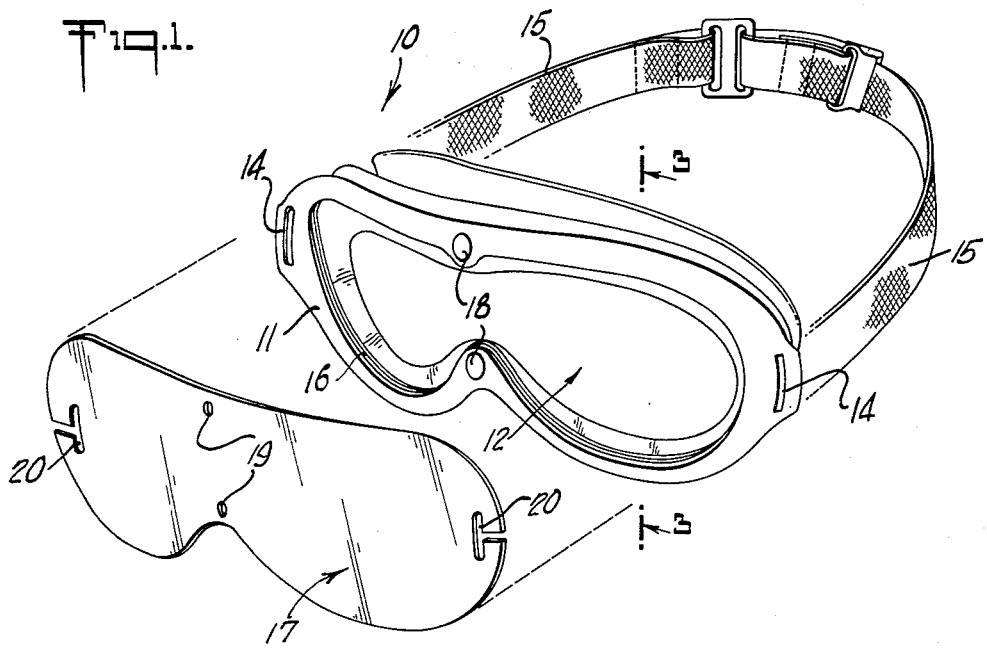
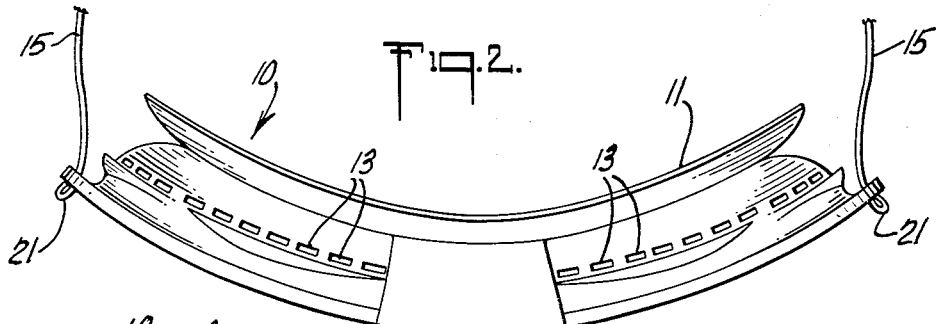
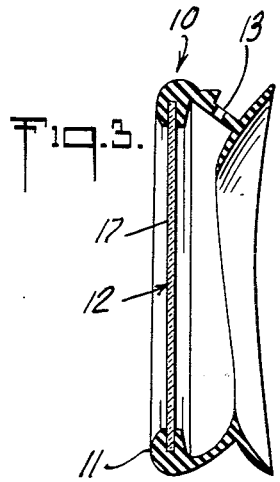
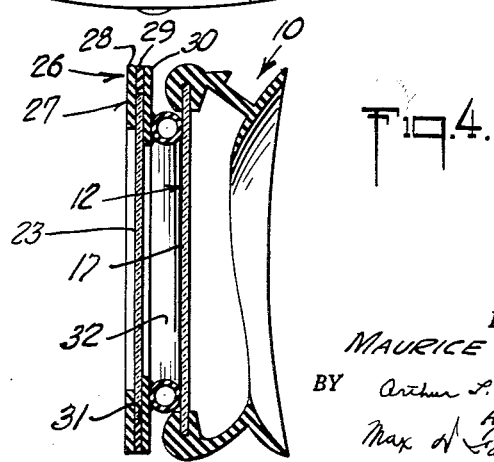
INVENTOR.
MAURICE KLEINMAN
BY Arthur P. Bowers
   AGENT
   Max N. Larimer
   ATTORNEY

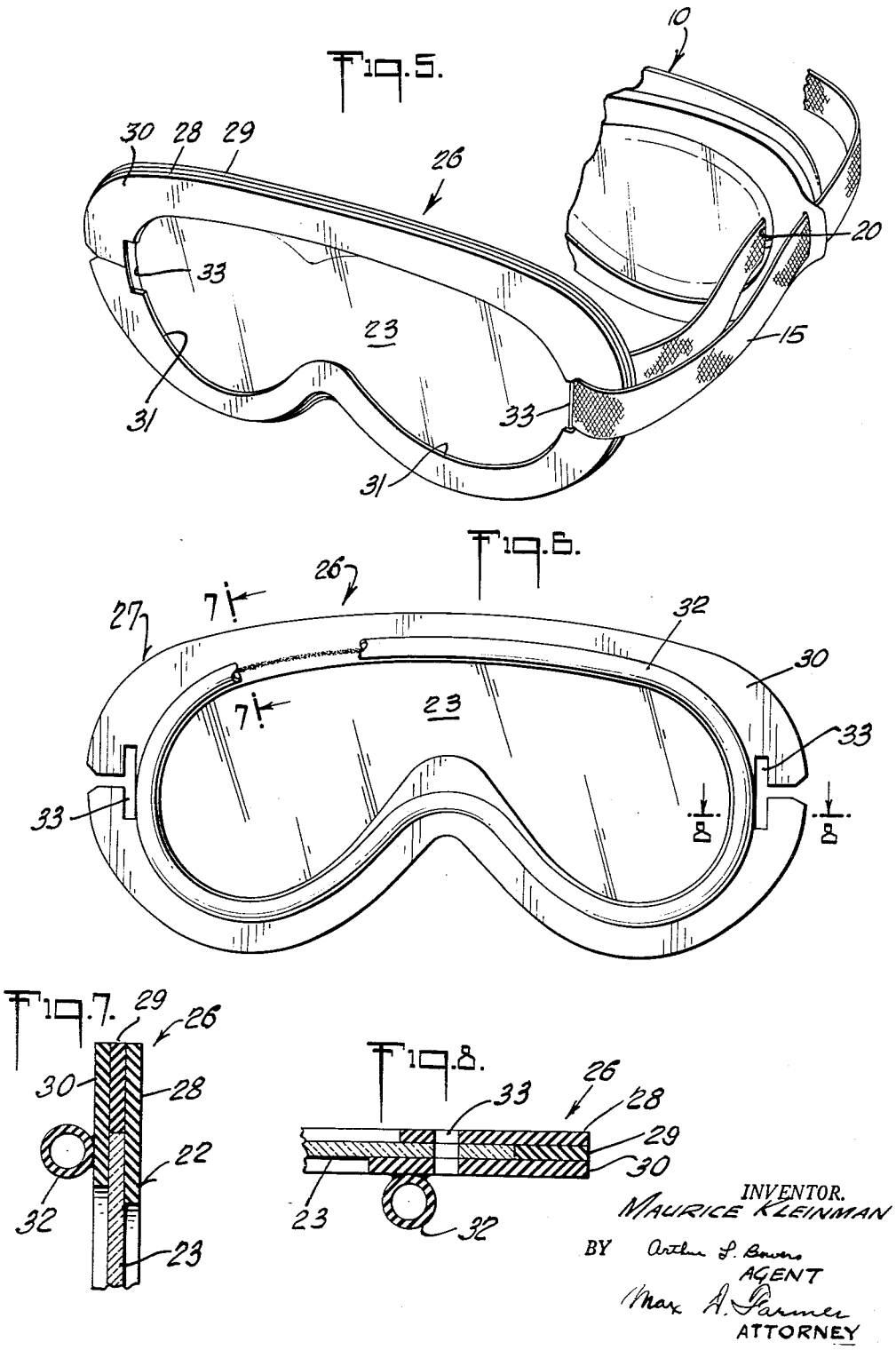

Dec. 12, 1961  M. KLEINMAN  3,012,248
ANTI-FOG LENS
Filed May 31, 1960  4 Sheets-Sheet 3
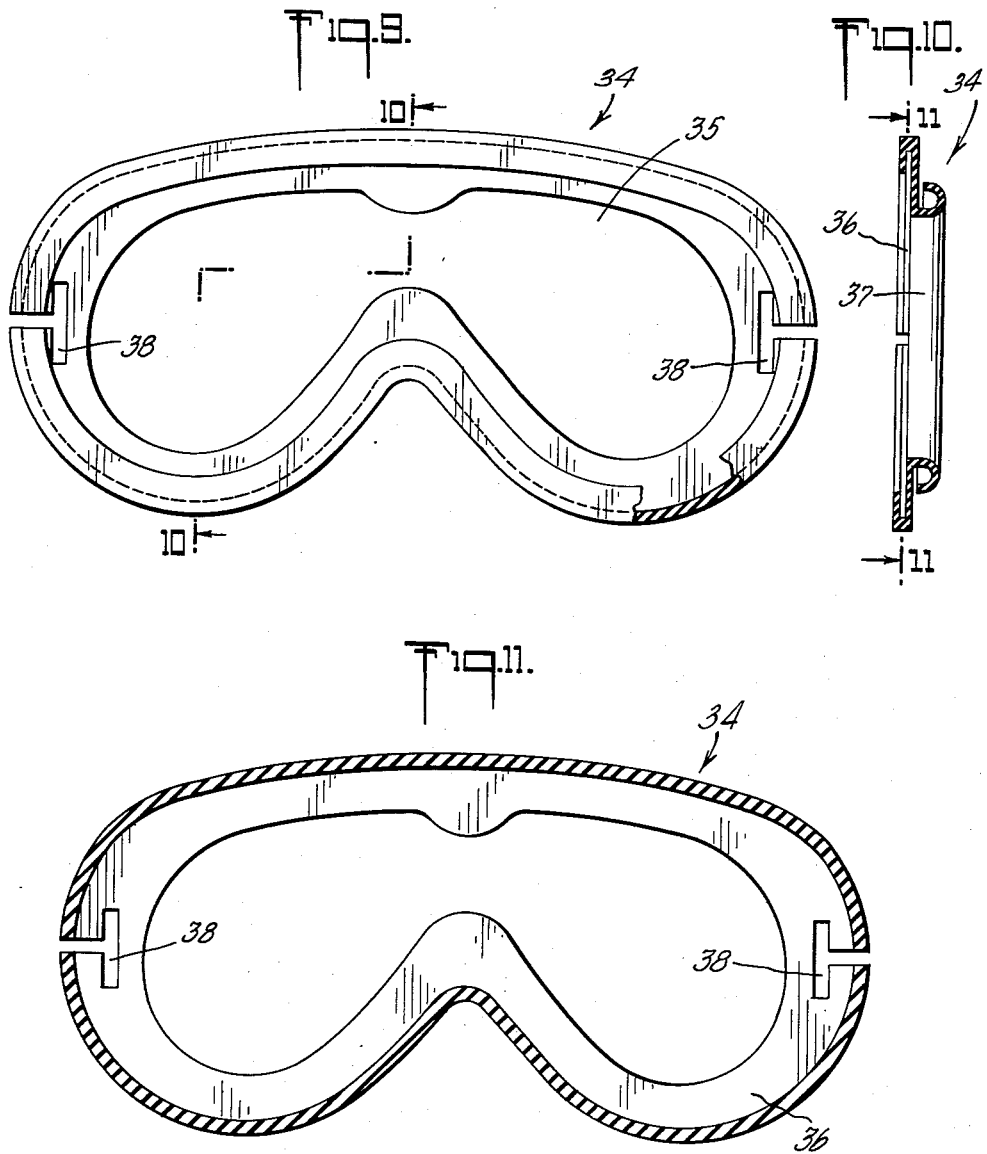
INVENTOR
MAURICE KLEINMAN
BY Arthur L. Bowers
AGENT
Max B. Garmer
ATTORNEY

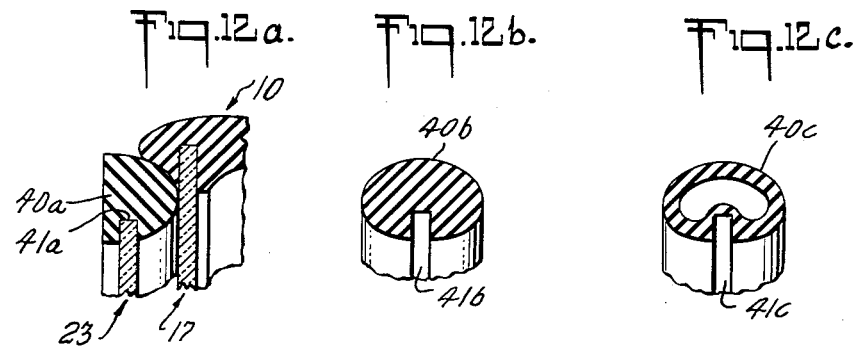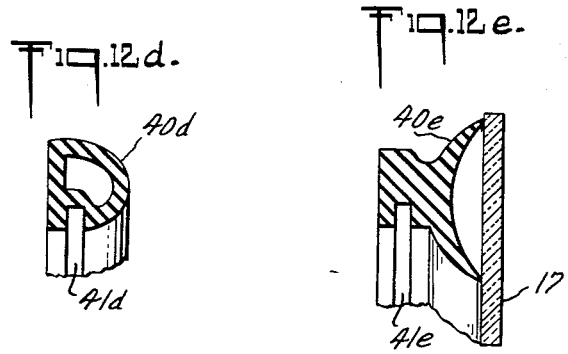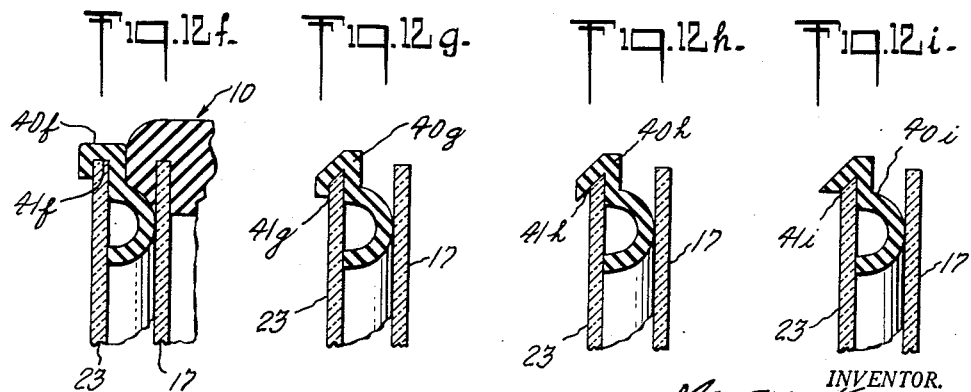

United States Patent Office 3,012,248
Patented Dec. 12, 1961

3,012,248
ANTI-FOG LENS
Maurice Kleinman, Huntington, N.Y., assignor to the United States of America as represented by the Secretary of the Navy
Filed May 31, 1960, Ser. No. 33,067
5 Claims. (Cl. 2—14)
(Granted under Title 35, U.S. Code (1952), sec. 266)

The invention described herein may be manufactured and used by or for the Government of the United States of America for governmental purposes without the payment of any royalties thereon or therefor.

This invention relates to reducing fogging at depressed temperatures in goggles of the type that have a frame for fitting the contour of the head and transparent lens or panel means carried by the frame for location in front of the eyes of the wearer and when worn confining a substantially closed air space around and in front of the wearer's eyes. This invention is applicable to a variety of goggle types ranging from aviator type goggles to underwater swimmers' face masks, but has particular utility in connection with eye protection goggles worn for protection against wind and cold and including a transparent panel of a flexible material confined in a pliable frame formed to fit across the eyes of the wearer and having an adjustable length strap engaging both ends of the goggles to fasten and retain the goggles on the head of the wearer.

Goggles that confine an approximately closed air space around the eyes of the wearer function satisfactorily at mild temperatures but cloud or fog in a short time when worn at depressed ambient temperatures. Fogging occurs because humidity rises in the space confined between the goggles and the wearer's head due to skin respiration. Moisture condenses on the inner surface of the transparent element as the latter is cooled by the outside air below the dew point of the air confined between the goggles and the face of the wearer. The dew point of the confined air constantly varies as the relative humidity and temperature of the air inside the goggles changes with skin respiration. Because the relative humidity would reach 100 percent in a very short time if the space confined by the goggles in front of the eyes were completely sealed, goggles other than those used by swimmers are usually formed with small distributed ventilation openings to limit the rise in humidity. The total area of the ventilation openings cannot be made large enough to completely prevent fogging because that would greatly diminish or completely compromise the usefulness of the goggles as cold weather protection for the wearer's eyes.

Anti-fog coatings have been used for this purpose but they have not proven to be adequately effective at temperatures on the order of 0° Fahrenheit and below and the coating needs to be renewed too often. Besides, anti-fog coatings have been found to interfere with vision as they become contaminated.

Another known method of reducing fogging is to deposit thin transparent metallic films on those surface areas of optical members likely to fog and then pass current through the films to heat the surfaces to keep the surface temperature above the dew point. The disadvantages of this method apart from reduced light transmission is the necessity for electrical leads, switch means, and a portable power supply, all to be carried by the wearer.

Another known method of solving the problem of fogging is similar to the defrosting method in automobiles, namely, to forcibly ventilate the inside of the goggles to remove moisture and to heat the inner surface. The disadvantage is that ventilation equipment must be carried.

An object of this invention is to reduce, delay, or eliminate fogging in conventional goggles, when worn, caused by reduction of the temperature of the transparent element below the dew point of the air on the inner side of the goggles and without structurally modifying or redesigning the conventional goggles.

A further object is to increase the utility of conventional or standard eye protection goggles when worn at depressed temperatures by reducing fogging therein without making it necessary to have goggles for use at temperatures at which fogging occurs and other goggles for use at temperatures where fogging is not a problem.

A further object is to increase antifogging characteristics of conventional eye protection goggles in cold weather applications simply and inexpensively.

Other objects and many of the attendant advantages of this invention will be readily appreciated as the same becomes better understood by reference to the following detailed description when considered in connection with the accompanying drawings wherein:

FIG. 1 is an exploded view of a common variety of eye protection goggles,

FIG. 2 is a plan view of the components of FIG. 1 assembled,

FIG. 3 is a vertical cross section taken on line 3—3 of FIG. 1,

FIG. 4 is a view similar to FIG. 3 with an attachment or auxiliary goggles according to this invention, in place, FIG. 5 is an exploded view of the attachment of FIG. 4 plus part of the eye protection goggles of FIG. 2, FIG. 6 is a rear view of the attachment shown in FIGS. 4 and 5, FIG. 7 is a cross section of a fraction of the attachment taken on line 7—7 of FIG. 6 on a larger scale, FIG. 8 is a cross section of a fraction of the attachment taken on line 8—8 of FIG. 6, on a larger scale, FIG. 9 is a front view of another embodiment without the transparent panel, FIG. 10 is a vertical cross section taken on line 10—10 of FIG. 9, FIG. 11 is a vertical cross section taken on line 11—11 of FIG. 10, and FIGS. 12a–12i inclusive illustrate in cross section other modifications of the attachment.

The pair of goggles 10 in FIGS. 1–3 is one example of a variety of commercially marketed eye protection goggles, and is intended for illustration purposes only and not in a limiting sense. This type of goggles, when worn, fits closely against the head of the wearer and substantially confines an air space in front of and about the eyes of the wearer. When the goggles are worn the relative humidity in the confined air space increases above that of the ambient relative humidity due to skin respiration of the wearer into the confined air space. The pair of goggles 10 includes an elastomeric, pliable, resilient frame 11 formed for seating and snugly fitting against the contour of the wearer's head across the eyes and defining a see-through area 12 for location in front of the wearer's eyes. The frame 11 is formed with a plurality of ventilation openings 13 and two slots 14 at opposite ends thereof for receiving and anchoring an adjustable length fabric fastening strap 15. The portion of the frame 11 bordering its see-through area 12 is formed with an endless channel-like recess 16 for snugly seating a removable flexible, transparent, air impervious panel 17. Two snap fasteners 18 are mounted on the frame to extend across the channel 16, for registration with holes 19 in the transparent panel 17, to detachably fasten the latter in place in the frame. The detachable panel is formed at its ends with slots 20 of a size sufficient for registration with strap ends 21, where necessary for securing the transparent panel in the frame. When the goggles are assembled, as shown in FIG. 2, each end 21 of strap 15 extends through a slot 14 in the frame 11, and may extend through a slot 20 in the panel. The strap ends are hemmed so as to be multi-layered but pliable, so that they can be forcibly manipulated through the slots 14 but, when in place, will anchor the strap against withdrawal from the frame 11.

The goggle attachment 26 shown in FIGS. 4–8 inclusive is operable to reduce fogging in the goggles 10 when worn at depressed temperatures. It includes a flexible, air impervious, transparent panel 23, which may be identical to the transparent panel 17. An elastomeric, pliable frame 27 having three layers 28, 29, 30 of elastomeric non porous material are cemented together to provide a channel 31 for snugly seating the transparent panel 23 therein. Cemented to one face of frame 27 is a substantially closed loop gasket spacer 32 of compressible elastomeric tubing. The configuration and outside dimensions of the gasket spacer 32 are selected so that when the attachment is assembled, the gasket will seat against transparent panel 17 alongside the inner periphery of pliable frame 11 as shown in FIG. 4. The gasket spacer is selected for obtaining a spacing on the order of ⅜ inch between the panels when attachment and goggles are assembled and worn.

The attachment 26 is assembled with the pair of goggles 10 as shown in FIG. 5 by threading each strap end 21 through a slot 14 of frame 11, rear to front, then around an end of the attachment 26 and through a slot 33 thereof front to rear, and finally through the slot 20 of the transparent panel 17. The strap is pulled tight to take up the slack between the goggles and the attachment, to force the gasket of the attachment 26 into snug engagement with the front face of the transparent panel 17 and whereby a substantially closed air chamber is confined between the two transparent panels 17 and 23.

The attachment 26 is assembled on the pair of goggles 10 in an environment where the temperature is low so that air captured between the transparent panels contains minimum moisture. Though the absolute humidity of the air between the panels is the same as the humidity of the environmental air where assembled, the air captured between the transparent panels will have a higher temperature and therefore a lowered relative humidity when the goggles are worn due to warming by the wearer. If the attachment is assembled indoors where the temperature is comparatively high, moisture will deposit on the inner face of the transparent panel 23 of the attachment 26 when the ambient temperature is substantially reduced due to the fact that the relative humidity of the captured air rises with drop in temperature.

The attachment does reduce peripheral vision somewhat, but the reduction is minor, less than twenty degrees, and hence, not serious.

An advantage of detachably supporting the transparent panel 23 in the attachment frame rather than permanently joining the two is that panel 23 can be used as a replacement spare for the panel 17 in the event that the panel 17 is damaged. Another advantage is that a transparent panel taken from stock can be used either as panel 17 or as panel 23.

In FIGS. 9–11 there is shown an attachment frame 34 similar to the frame 27 having a see-through area 35, a channel 36 for snugly seating a transparent panel, an elastomeric deformable gasket-like portion 37, and a slot 38 at each end for registration with a fastening strap. The attachment frame 34 differs from frame 27 in that it is molded in one piece as compared to the several cemented together sections of frame 27.

In FIGS. 12a through 12i there are shown several other configurations of the frame, 40a–40i having channels 41a–41i respectively molded integrally. The frame embodiment shown in FIG. 12e is designed for a suction seal against the goggle panel to ensure a sealed-in air space. The various attachment frames illustrated differ in terms of cost, pliability, ease of assembly and removal of the transparent panel from the frame, etc.

In a simplified embodiment of the invention, not illustrated, the gasket spacer 32 in FIGS. 6–8 is cemented directly to one surface of the transparent panel adjacent its periphery instead of to a frame. An advantage is reduced cost especially where only one attachment is needed. Also, there may be less reduction of peripheral vision. A disadvantage is that the auxiliary panel lacks adequate mechanical protection against damage. Also, it is more troublesome to cement the transparent panel and gasket spacer than to insert the transparent panel in a frame, especially in the field. Also, while one transparent panel can be used as a replacement either for a main or auxiliary panel in the illustrated embodiments, two different panels are needed if the auxiliary panel and the gasket are cemented together, one for the main panel and one for the auxiliary panel. Also, the simplified embodiment does not lend itself to a choice of colors, in the field, whereas with the illustrated embodiments, several different colored transparent panels may be carried and anyone of them selected for mounting in the auxiliary frame. An elastomeric, pliable frame 27 having three layers 28, 29, 30 of elastomeric non porous material are cemented together to define a channel 31 for snugly seating the transparent panel 23 therein. Cemented to one face of the frame 27 is a substantially continuous gasket spacer 32, formed from compressible elastomeric tubing. The configuration and outside dimensions of the gasket spacer 32 are selected so that when the attachment is assembled, the gasket will seat against transparent panel 17 alongside the inner edge of pliable frame 11 as shown in FIG. 4. The thickness of the gasket spacer measured normal to the transparent panel 23 is on the order of ⅜ inch. At assembly with the pair of goggles 10, the strap 15 is threaded through the attachment as in the embodiment shown in FIG. 2. A disadvantage of an auxiliary frame as shown in FIGS. 3 and 4 as opposed to cementing a gasket directly to one face of the transparent panel is that peripheral vision is more limited with the auxiliary frame. On the other hand, an advantage is that more than one color panel can be carried and assembled in the frame.

Though a double lens system alone cannot provide a completely fog-free goggle under all weather conditions, it does reduce or delay fogging to a considerable extent under all weather conditions, over the results obtained with a single lens goggle. A method of increasing the effectiveness of the double lens system is to apply a thin transparent metallic coating to one face of each lens (e.g., vacuum coating the surfaces with silver as in Thermos bottles) to increase temperature insulating properties. Since this method reduces the amount of light that reaches the wearer's eyes, it is doubly advantageous in areas where light intensity is excessive, namely in polar regions.

Since the included air layer is the main insulator, it might appear advantageous that the gasket spacer be made very thick to provide a large insulating air space between the panels. However, it was discovered that the binocular field of view is progressively diminished with increased air space thickness, that the probability of moisture condensation in the air space increases with increase in air space volume, and there is increased probability of the outer panel buckling in the center with increased air space thickness. An air space thickness of about ⅜ inch was found to be satisfactory.

The double lens system for goggles described herein provides an air insulator against external cold air. The enclosed air layer prevents or reduces the time for moisture condensation deposits to form on the interior face of the transparent panel of the goggle as a result of reduction in the temperature of that face below the dew point.

The adapter may be formed as part of the goggle; that is, the goggle may be formed with a sealed double transparent panel or lens with rigid sides cemented or molded to a flexible flange and with low moisture content in the included air, but this arrangement has several disadvantages over the described arrangement. First, it is expensive to fabricate. Second, the flexibility of the frame is reduced leading to a poor fit on the wearer's head. Third, the transparent element would have to be fabricated to withstand pressure changes in the sealed-in air space. Fourth, the double lens must be used even under weather conditions where a double lens may be unnecessary.

Obviously many modifications and variations of the present invention are possible in the light of the above teachings. It is therefore to be understood that within the scope of the appended claims the invention may be practiced otherwise than as specifically described.

I claim:

1. An improved goggle comprising an elastomeric frame formed for snugly fitting the contour of a wearer's head about his eyes and formed with distributed ventilation openings to permit a gradual exchange of air therethrough to limit rise of humidity within the goggle when worn, said ventilation openings being sufficiently small and few in number so that the goggle affords ample protection to the wearer's eyes against adverse weather conditions, a strap engaging opposite ends of the frame for engaging the back of the wearer's head to retain the frame snugly fitted against the contour of the wearer's head, main flexible transparent air impervious panel means carried by said frame and at the peripheral edge thereof in continuous intimate engagement with the frame for location in front of the eyes of the wearer, whereby said goggles are able to confine an approximately closed air chamber about the eyes of the wearer and whereby exchange of air through the ventilation openings retards rise in humidity within the chamber resulting from skin respiration of the wearer, an auxiliary flexible air impervious transparent panel means similar in size to the panel means of said conventional goggle means disposed in face to face relation therewith and having opposed end portions detachably engaged with said strap, a gasket spacer member confined between said two panel means and extending continuously along one face and adjacent the peripheral edge of said auxiliary panel means, whereby when the goggle is worn the strap is tensioned and thereby forces the auxiliary panel means and gasket spacer to conform to the main panel means and fit snugly thereagainst to confine an air chamber between the two panel means to resist heat transfer at depressed temperatures through the main panel means that leads to fogging, said auxiliary panel means being detachable from the strap and removable from the goggle when not needed.

2. An attachment for use at depressed temperatures for resisting fogging in a conventional goggle means of the type having an elastomeric frame formed for snugly fitting the contour of a wearer's head about his eyes and having a strap engaging opposite ends of the frame for engaging the back of the wearer's head to retain the frame snugly fitted against the contour of the wearer's head, and flexible air impervious transparent panel means carried by said frame and at the peripheral edge thereof in continuous intimate engagement with the frame, for location in front of the eyes of the wearer whereby said goggles are able to confine an approximately closed air chamber about the eyes of the wearer; which attachment comprises an auxiliary flexible air impervious transparent panel means similar in size to panel means of said conventional goggle means and having opposed end portions formed for engagement with said strap, a gasket spacer member in intimate engagement with one face of said auxiliary panel means continuously around the periphery thereof whereby when said auxiliary panel means is disposed face to face with the outer face of the panel means of said conventional goggle means with the gasket spacer member confined therebetween and the strap is engaged with the end portions of said auxiliary panel means and pulled tight the attachment is snugly fitted against the outer face of the auxiliary panel means resisting heat loss through the panel means of the conventional goggle when worn in depressed temperatures thereby resisting fogging on the inside face of the panel means of the conventional goggle.

3. An attachment for resisting fogging in a conventional goggle means of the type having a pliable frame formed for snugly fitting the contour of a wearer's head about his eyes, a strap engaging opposite ends of the frame for engaging the back of the wearer's head to retain the frame snugly fitted against the contour of the wearer's head, and transparent panel means carried by said frame for location in front of the eyes of the wearer and for confining an approximately closed air chamber about the eyes of the wearer, which attachment comprises an auxiliary goggle means formed to detachably fit snugly against the front of said conventional goggle means and formed at opposite ends thereof with portions engageable by said strap whereby said auxiliary goggle means may be forcibly fitted and retained by the strap snugly against the front of said conventional goggle means, said auxiliary goggle means having substantially air impervious transparent panel means located in front of but spaced from the panel means of the conventional goggle means when said auxiliary goggle means is forcibly fitted snugly thereagainst, for forming an approximately closed air chamber between the panel means of both said goggle means.

4. A non-fogging goggle comprising a conventional goggle means of the type having a frame formed for fitting the contour of a wearer's head to include the wearer's eyes within the fitted contour and a transparent panel means carried by said frame for location in front of the eyes of the wearers for confining an approximately closed air chamber about the eyes of the wearer, and an auxiliary goggle means detachably fitted against the front of said conventional goggle means and having transparent panel means in front of and spaced from and substantially identical to the panel means of the conventional goggle means and forming an approximately closed air chamber between the panel means of both goggle means.

5. An improved goggle as defined in claim 1 wherein said auxiliary panel is identical in size to said main panel means whereby the auxiliary may also be used as a replacement for the main panel means.

References Cited in the file of this patent

UNITED STATES PATENTS

| 2,130,127 | Fischer | Sept. 13, 1938 |
| 2,573,722 | Maurer et al. | Nov. 6, 1951 |

FOREIGN PATENTS

| 699,153 | Germany | Nov. 23, 1940 |
| 522,788 | Canada | Mar. 20, 1956 |